United States Patent [19]
Yoshioka et al.

[11] 3,926,289
[45] Dec. 16, 1975

[54] VARIABLE SPEED TURNING CHUTE FOR RAW MATERIAL TO BE DISCHARGED

[75] Inventors: Kengo Yoshioka; Teruhiko Shiraishi, both of Kitakyushu, Japan

[73] Assignee: Nippon Steel Corporation, Tokyo, Japan

[22] Filed: Dec. 20, 1973

[21] Appl. No.: 426,812

[30] Foreign Application Priority Data
Dec. 25, 1972 Japan............................ 48-2665[U]

[52] U.S. Cl.............. 193/23; 214/35 R; 222/144.5
[51] Int. Cl.².......................................... B65G 11/12
[58] Field of Search..................... 193/23, 14, 2 R, 3; 214/35 R, 17 CB; 266/27; 222/144, 144.5

[56] References Cited
UNITED STATES PATENTS

| | | | |
|---|---|---|---|
| 2,436,624 | 2/1948 | Volk | 193/23 |
| 3,232,458 | 2/1966 | Freeman | 214/17 CB |
| 3,430,788 | 3/1969 | Edming | 214/17 CB |
| 3,651,964 | 3/1972 | Nieboer | 193/23 X |
| 3,780,887 | 12/1973 | Bottoms | 214/17 CB |

*Primary Examiner*—Richard A. Schacher
*Assistant Examiner*—James L. Rowland
*Attorney, Agent, or Firm*—Toren, McGeady and Stanger

[57] ABSTRACT

A variable speed turning chute for raw material to be discharged having an upper part and a lower part, each of which may be rotated in either a clockwise or counter-clockwise direction, at least two outlets of different dimensions formed in the lower part of the chute which correspond to the rotational locus of a board on the upper part of the chute for selectively closing off one of the outlets, and a turning ring which has engaging means thereon that allows the upper part of the chute to rotate relative to the lower part for a certain angle until one of the outlets is closed off by the board whereby the lower and upper parts of the chute are then rotated together in the same direction by a driving device provided at the upper part of the chute or, alternatively, at the lower part.

9 Claims, 6 Drawing Figures

VARIABLE SPEED TURNING CHUTE FOR RAW MATERIAL TO BE DISCHARGED

SUMMARY OF THE INVENTION

The present invention relates to a turning chute for raw material to be charged by which raw materials are uniformly charged to, for example, an ore storage hopper, etc., in which the outflow speed of the discharged raw material is varied freely so that various raw materials with different fluidity can be distributed in an optimum manner.

A turning chute has been employed conventionally in many applications, and particularly in a blast furnace it has been used at the top of the raw material charging part since many years ago a uniform distribution of the charged raw materials was required in its operations.

In a blast furnace operation, the use of pellets has been required because of the recent ore situation and for the purpose of further lowering the coke ratio, therefore development of such an apparatus adapted for the charging of large volume of pellets is desired.

One of the problems in charging large amounts of raw material is that the discharging apparatus should be able to distribute not only pellets that flow easily but also differently shaped materials such as sintered ore, coke, etc., that do not flow as easily.

In a continuously turning chute of a conventional charging apparatus, uniform distribution is secured by scattering raw materials which fall and flow out of a skip car or a conveyor, and the uniform distribution of the raw materials can be secured by accumulating raw materials in the turning chute and by increasing the number of piled layers of raw materials scattered.

For that end it is desired to accumulate raw materials within the chute and to make the time of the raw materials pass through the turning chute as long as the charging schedule permits.

However, in the case of a conveyer charging system, the charging time can be as long as several tens of seconds. This means that a large number of piled layers can be formed. This, however, is difficult to control since it is hard to prevent the overflow of large accumulations of raw material in the chute. In this conveyer system, charging of both coke and pellets, both of which have different degrees of fluidity, cannot be achieved by using a conventional turning chute having an outlet that would be used for both the charging of either coke or pellets. On the other hand, in the case of skin charging, accumulation of the raw material can be realized, but the charging through the same outlet of both pellets, coke, etc. inevitably affects the speed that they pass through the outlet due to their inherent flow characteristics. This leads to unwanted differences in distribution which simply cannot be eliminated.

That is, as the fluidity becomes greater, the flow out time is reduced and as a result the number of piled layers is reduced and the distribution tends to become poor. In case of pellets, the above tendency is conspicuous and good distribution cannot be secured by the outlet diameter of the turning chute as determined by the passing time of coke having the lowest fluidity among the materials. When the outlet diameter of the turning chute is reduced to such a size as to achieve the number of piled layers required for distribution of pellets, the outflow time of coke becomes quite longer.

The increase in the outflow time of raw materials from the turning chute reduces the number of charges possible per day and makes the opening time of the seal valve longer. Also the time during which differential pressure works on the top and bottom of the small bell becomes longer, which will shorten the life of the small bell.

Therefore the present invention is intended to overcome the problem of difference in the fluidity of various raw materials charged and to provide a turning chute in which outlets suited for each of the raw materials are prepared beforehand and one of the same is selected as necessary, thus controlling the outflow speed of each of the raw materials. The invention is characterized by that a variable speed device for outflowing raw materials is so formed that a turning chute is formed by dividing the same into an upper part (A) of the chute and the lower part (B) of the chute, rotation of each one of which can be reversed, and at the same time at least two or more of outlets having different diameters are provided at such a position on the lower part (B) as corresponding to the rotational locus of a lower port of the upper part (A) Furthermore, a turning ring having engaging means thereon allows the upper part of the chute to rotate relative to the lower part of the chute for a certain, predetermined angle so that the board on the upper part of the chute covers a selected outlet on the lower part, at which point both the upper and lower parts rotate together.

BRIEF DESCRIPTION OF THE DRAWING

Next the present invention shall be explained in detail by examples shown in the drawings.

DETAILED DESCRIPTION OF THE INVENTION

Figure 1:
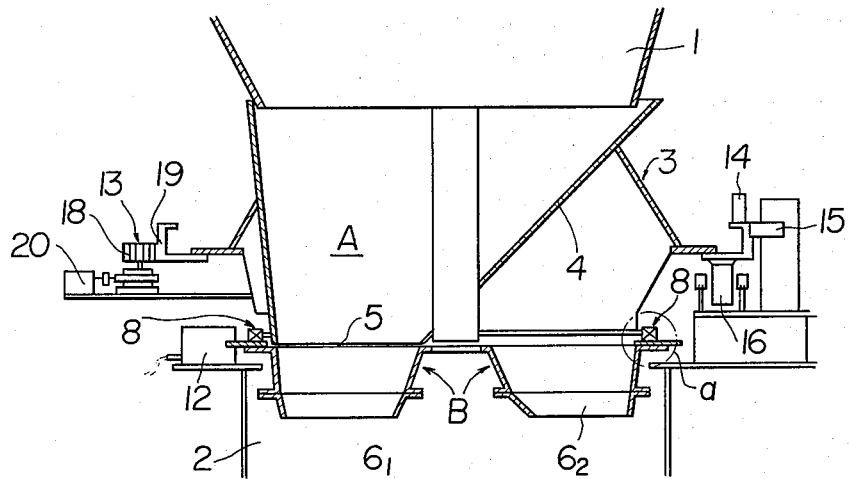
FIG. 1 is a vertical sectional view of the device of the present invention.

In FIG. 1, (1) is an ore receiving hopper (or a conveyer chute), (2) is an ore storage hopper (or a distribution chute), and there is provided therebetween the turning chute (3) of the present invention.

The turning chute (3) is so formed as being divided into an upper part (A) and a lower part (B), each one of which can have its rotation reversed.

A side wall part (4) of the upper part (A) is gradually inclined to drop and guide raw materials to be charged and at the same time a lower port (5) (refer to FIGS. $3a$ and $3b$) is formed at the lower portion.

A coke outlet ($6_1$) and a pellet outlet ($6_2$) having a little smaller diameter than that of the coke outlet ($6_1$) are provided at the lower part (B) of the chute, and the two outlets ($6_1$) ($6_2$) are provided at such positions as being on the same circumference with the rotation locus (P) (refer to FIGS. $3a$ and $3b$) of the lower port (5) of the upper part (A). In the embodiment shown in FIGS. 1–5, the outlets ($6_1$) and ($6_2$) are positioned 180° from each other when measured along the circumference (P). It is to be noted, however, that any suitable number of outlets may be provided, not just two, with appropriate, angular separations between them.

Figure 2:
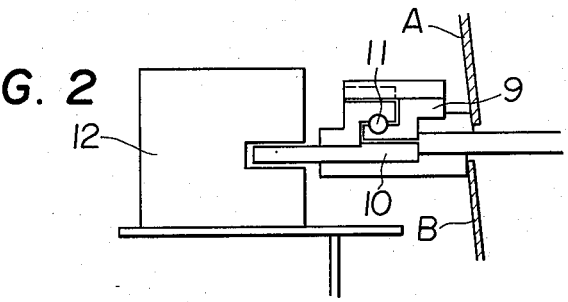
FIG. 2 is a detailed drawing of a part ($a$) in FIG. 1. FIG. $3a$ and FIG. $3b$ are schematic drawings of the turning ring mechanism in the present invention.

A turning ring (8) is provided between the upper part (A) and the lower part (B), and it has such a structure that the lower port (5) of the upper part (A) can select the outlet suitable for the raw material to be charged as necessary. The structure of the turning ring (8) is shown in FIG. 2 and FIGS. 3a and 3b in which a ring (9) on the upper part (A) and a ring (10) on the lower part (B) are assembled together with a steel ball (11) being positioned therebetween.

The rings (9) (10) of the turning ring (8) have stoppers so that the upper part (A) and the lower part (B) can rotate relative to each other for a predetermined angle. Two stoppers (II) (III) are provided at the outer circumference of the ring (9) of the upper part (A) with 180° interval, while one stopper (I) is formed at the inner circumference of the ring (10) of the lower part (B), so that they can rotate relatively as much as 180°. Naturally the position and the number of the stoppers of the ring (9) of the upper part (A) can be suitably determined based on the position and the number of the outlets provided, and when three or more of the same are to be provided, such stoppers should be so made as freely coming out and in at the side face of the turning rings. While such number of stoppers as corresponding to the number of the outlets (6) are provided on the ring (9) of the upper part (A) in this example, an opposite arrangement is also possible; that is such a number of stoppers as corresponding to the number of the outlets (6) may be provided on the ring (10) of the lower part (B).

Figure 3A:
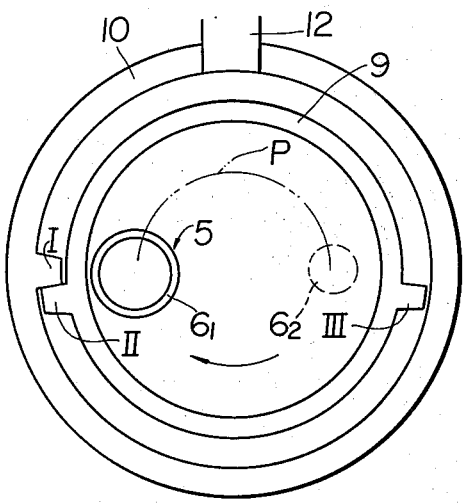
Figure 3B:
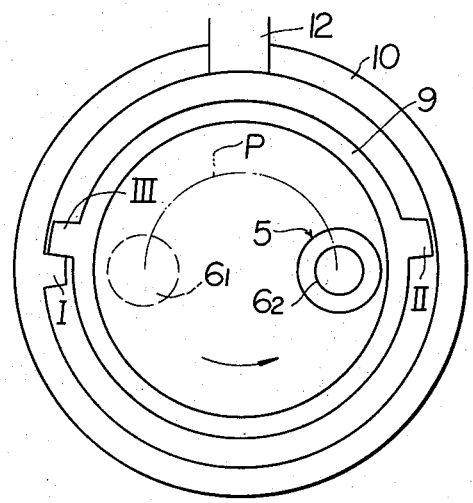

Next, the function of the chute shall be explained by referring to FIGS. 3a and 3b. When the upper part (A) is rotated in a forward direction (as shown by an arrow) from its stationary position as shown in FIG. 3a, the upper part (A) moves until the stopper (II) of the ring (9) engages with the stopper (I) of the ring (10) on the lower part (B), while the ring (10) of the lower part (B) stays in a stationary state. In a state wherein stoppers (I) and (II) engage together, in other words the lower port (5) of the upper part (A) is connected through with the outlet ($6_1$) for coke, the outlet side ring (10) is pushed by the upper part (A) thus making combined rotation. On the other hand, when the upper part (A) is rotated in a reverse direction as shown in FIG. 3b (as shown by an arrow), the ring (10) of the lower part (B) stays in a stationary position until the stoppers (I) (III) engage with each other, and when they are engaged, in other words, when the lower port (5) of the upper part (A) is connected through with the outlet ($6_2$) for pellets at the lower part (B), the lower part (B) is pushed by the upper part (A) and thus causing combined rotation of both parts.

At that time a brake (12) is provided at the circumference of the ring (10) of the lower part (B) or on lower part (B) itself to provide a braking torque on the lower part (B) in a direction opposite to the rotating direction, so that the ring (10) of the lower part (B) will not move before the stoppers of both rings (9) (10) engage together. Therefore, there will be no shifting or deviation between both rings while both rings are being rotated as their stoppers are engaged together by reduction in the speed of the turning chute or other causes.

(13) is a driving device to turn the turning chute and is adjacently connected to the upper part (A), but it may be adjacently connected to the lower part (B) as necessary.

Because of the necessity for reverse rotation in this example, a direct current motor (20) is employed in the driving apparatus (13), but an A.C. motor may also be used. The motor (20) rotates the turning chute (3) through a pinion (18) and a ring gear (19).

In the drawing, (14) is a roll for preventing the upper part (A) from vertical displacement, (15) is a holding roll against centrifugal force, and (16) is a supporting roll.

Figure 4:
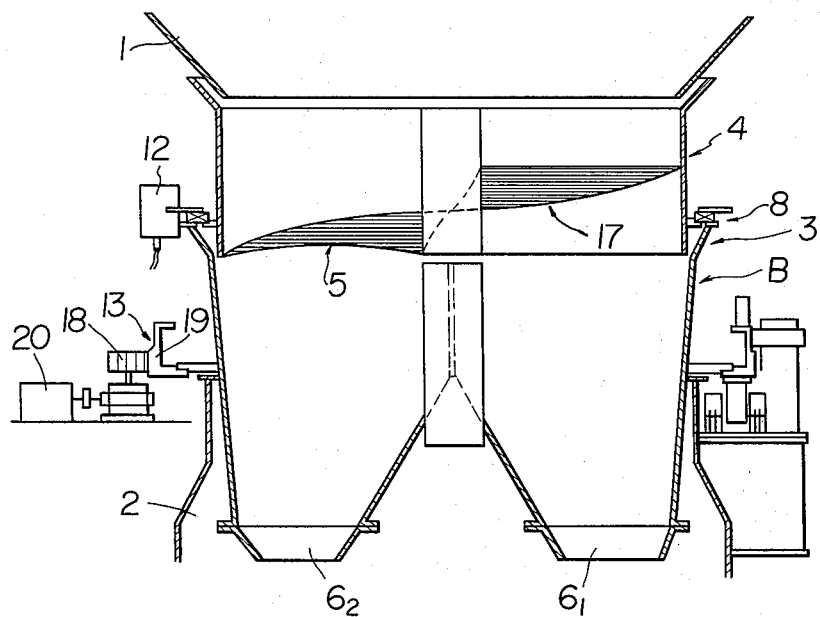
FIG. 4 is a schematic drawing of another example of the present invention.
Figure 5:
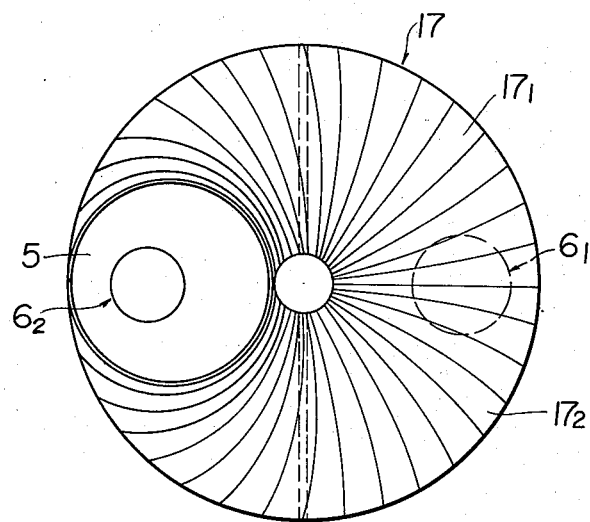
FIG. 5 is a schematic drawing of a guide shade in FIG. 4.

FIG. 4 shows another example of the present invention, wherein a turning chute (3) is divided into an upper part (A) and a lower part (B) as in the above mentioned example. The lower part (B) has two or more outlets, for example a coke outlet ($6_1$) and a pellet outlet ($6_2$), wherein the difference from the above mentioned example is that a guide shade (17) is provided in the upper part (A) to guide the raw materials charged, and the guide shade (17) has 180° spiral plates ($17_1$) ($17_2$) composed symmetrically and has a lower port (5) formed at its bottom.

The mechanism for the lower port (5) selects outlets (6) in the lower part (B) in the same manner as indicated in the above mentioned example.

The raw material to be charged is guided by the spiral shaped inclined face of the guide shade (17) and is charged into a storage hopper (2) (or a distribution hopper) while being rotated from outlets (6) which are suitably selected and are connected through.

While in this example a turning driving device (13) is adjacently connected to the lower part (B), it may be provided at the above mentioned upper part (A).

As has been explained in detail according to the device of the present invention, as such outlets can be suitably selected as corresponding to each raw material to be charged, the charging speed of the raw materials can be appropriately controlled, and as a result, for example in a blast furnace uniform, distribution of raw materials to be charged can be maintained in the blast furnace. Very satisfactory results can be obtained in operations, and thus has great practical values.

What is claimed is:

1. A variable speed turning chute for raw materials to be discharged, comprising an upper part rotatable about an axis having means for guiding the raw material therethrough, a rotatable lower part mounted below said upper part and coaxial therewith, said lower part having two outlets formed therein, one of said outlets discharging the raw material guided to it by said means for guiding the raw material, driving means operatively connected to one of said upper and lower parts, and means interconnected between said upper and lower parts for maintaining said parts freely rotatable relative to each other for a predetermined angle and thereafter effecting engagement between said upper and lower parts for rotation thereof in unison so that one of said outlets of said lower part may be selectively aligned with said means for guiding the raw material, whereby raw material of different flow characteristics may be discharged through one of said outlets designed specifically therefor.

2. A variable speed turning chute according to claim 1 wherein said upper part comprises a slanted side wall, said means for guiding the raw material comprising said side wall and a port located at the bottom of said wall proximate said lower part, whereby the raw material is guided down said side wall by gravity and exits through said port to one of said outlets of said lower part.

3. A variable speed turning chute according to claim 1 wherein one of said outlets of said lower part is of a different size than the other so that each outlet operates for discharging a particular predetermined type of raw material.

4. A variable speed chute according to claim 1, wherein said means connected to both of said upper and lower parts comprises a turning ring having a first portion mounted to the bottom of said upper part, and a second portion mounted to the top of said bottom part, each of said first and second portions having engaging means thereon for permitting relative rotation of said upper part relative to said lower part until the engaging means of said first portion contacts the engaging means of said second portion.

5. A variable speed chute according to claim 4, wherein said lower part comprises two outlets angularly spaced 180° apart, said engaging means of said first portion comprising two stops extending outwardly in a direction away from said means for guiding the raw material and spaced 180° apart on the circumference of said first portion, said engaging means of said second portion comprising one stop extending inwardly from said second portion in a direction toward said outlets, said one stop situated along a line connecting the centers of said two outlets.

6. A variable speed chute according to claim 5, further comprising brake means for applying a braking torque to said second portion to assure proper contact between said engaging means on said first and second portions.

7. A variable speed chute according to claim 1, wherein said driving means rotates said upper and lower parts in either a clockwise or counterclockwise direction.

8. A variable speed chute according to claim 1, wherein said means for guiding the raw material comprises a guide chute mounted inside said upper part and including two spiral plates for guiding the raw material therealong and down to one of said outlets.

9. A variable speed chute according to claim 1, wherein said outlets are circularly shaped, each of said outlets having a diameter different from that of the others.

* * * * *